United States Patent [19]
Wilson

[11] Patent Number: 5,598,808
[45] Date of Patent: Feb. 4, 1997

[54] RIPPLE CONTROL MILKING MACHINE PULSATORS

[75] Inventor: Allan W. Wilson, Hamilton, New Zealand

[73] Assignee: Carter Holt Harvey Plastic Products Group Limited, Hanilton, New Zealand

[21] Appl. No.: 294,538

[22] Filed: Aug. 23, 1994

[30] Foreign Application Priority Data

Aug. 23, 1993 [NZ] New Zealand ............................ 248467

[51] Int. Cl.⁶ ........................................................ A01J 5/14
[52] U.S. Cl. ...................................... 119/14.28; 119/14.37
[58] Field of Search ............................ 119/14.41, 14.37, 119/14.38, 14.39, 14.4, 14.07, 14.08, 14.3, 14.28

[56] References Cited

U.S. PATENT DOCUMENTS 3,703,645  11/1972  Swift ...................................... 119/14.18
4,690,099   9/1987  Gregan et al. ......................... 119/14.28

FOREIGN PATENT DOCUMENTS 210351   5/1988  New Zealand .
220533   6/1989  New Zealand .
1630712  2/1991  U.S.S.R. .............................. 119/14.07
1229893  4/1971  United Kingdom ................ 119/14.41

*Primary Examiner*—Todd E. Manahan
*Attorney, Agent, or Firm*—Jacobson, Price, Holman & Stern, PLLC

[57] ABSTRACT

An electrically controlled dedicated pulsator suitable for use as one of several pulsators in a milking machine. The pulsator includes a computerized processor and a timer. The computerized processor determines the pulsation sequence and the start delay of the pulsation sequence. In particular, the computerized processor determines the start time by reference to the timer which is initiated solely by reference to the commencement of electrical energization of the electrically controlled pulsator.

7 Claims, 4 Drawing Sheets

RIPPLE CONTROL MILKING MACHINE PULSATORS

TECHNICAL FIELD

The present invention relates to improvements in and/or relating to the control of pulsators in a milking machine and related means and methods.

BACKGROUND ART

Several methods of control of the milking sequence in a milking machine where sets of cups have, in common, a common vacuum source and common milk lines are known. Such control systems to provide a ripple in the sequence to avoid overloading of either the milk line or the vacuum source are known and such control systems range from multi-phase control boxes to a system which sequences itself on a signal sent from one pulsator to another. By way of an example of such systems, reference should be made to New Zealand Patent Specification Nos. 210351 and 220533, the full content of which is hereby here incorporated by way of reference.

The present invention, however, provides a departure from such systems.

DISCLOSURE OF THE INVENTION

In a first aspect of the present invention consists in an electrically controlled dedicated pulsator suitable for a milking machine wherein said pulsator has its pulsation sequence controlled by processing means associated with or including timing means, the arrangement being such that, upon receiving an external signal (eg. electrical energisation), the start delay of the pulsation sequence as well as the pulsation sequence itself is determined by the processing means.

In a second aspect the present invention consists in a milking machine having a plurality of milking claws, each controlled by an electrically controlled dedicated pulsator or pulsators, the pulsator or pulsators of each claw each having its pulsation sequence or sequences controlled by processing means (eg. a computerised processor (CPU) associated with or including timing means, the arrangement being such that there is a ripple sequencing of the pulsation of milking claws by said processing means, each claw being so controlled without signals from or to other claws, ie. by reference to its timing means.

Preferably said external signal is the energisation of the electrical system of the milking machine.

Preferably said timing means are each synchronised upon start up.

Preferably each pulsator is recognised by its processing means (CPU) by a reference number and a common program which includes most if not all of the reference numbers of the different pulsators is included in each programmed CPU.

In a further aspect the present invention consists in a method of ripple sequencing the pulsation of a plurality of pulsators in a milking machine which comprises having each milking claw provided with a processing means (eg. programmed computerised processing unit (CPU) capable of recognising the pulsator it controls and upon electrical start up of the pulsator having the phasing of the pulsation sequence of each milking claw controlled by its own processing means (CPU) without reference to any other processing means (CPU) or the status of any other pulsator otherwise than by reference to a timer.

Preferably each pulsator has its own dedicated timer and such timers are synchronised upon electrical start up.

BRIEF DESCRIPTION OF THE DRAWINGS

One preferred form of the present invention will now be described with reference to the accompanying drawings in which:

In known milking systems wherein a pulsator is provided to switch the outside fluid supply about milk cup inflations of a milking claw between a vacuum or lower pressure connection and an atmospheric or higher pressure connection and thereby induce the milk from the teat, it is desirable that the pulses of the different claws be staggered or offset in some manner in order to prevent overload of the common milk line, and/or prevent overload of the vacuum source by their being or coming into phase. As shown in FIG. 3, it is desirable that the pulsator of differing claws 21, 22, 23 and 24 be out of phase to an extent that the "on" condition or connection to the vacuum of the various claws be staggered such that the number of claws which are "on" or connected to the vacuum at any one time is less than the total number of claws connected.

It can also be seen that where the milking claw is operated in the known "2+2" sequence that is the four cups are split into two pairs which are each operated or connected to the vacuum together it is desirable that the operation of the two pairs of cups be also staggered or offset with respect to adjacent claws.

Figure 3:
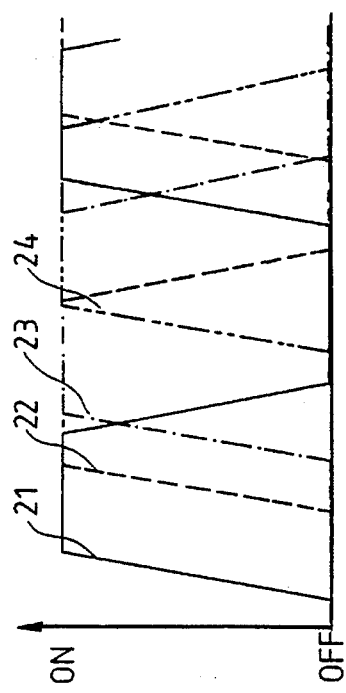
FIG. 3 shows a graph of one form of the ripple sequencing of the pulsation of the plurality of pulsators in a milking machine according to one possible embodiment of the present invention.

Therefore the lines of the graph shown in FIG. 3, i.e. 21, 22, 23, 24 represent either the sequence of pulsing adjacent milk claws when sequence in the known 4+0 formation or the sequence of a nominal mid point of the cycle of the pulsing of milk claws when run in the known 2+2 sequence.

The present invention provides a method of ripple sequencing the pulsating of a plurality of pulsators in a milking machine, each pulsator provided with a programmed CPU. The programmed CPU is capable of recognising the sequence in which the pulsation it controls is to be pulsed without reference to a common controller but to its own timer.

Figure 1:
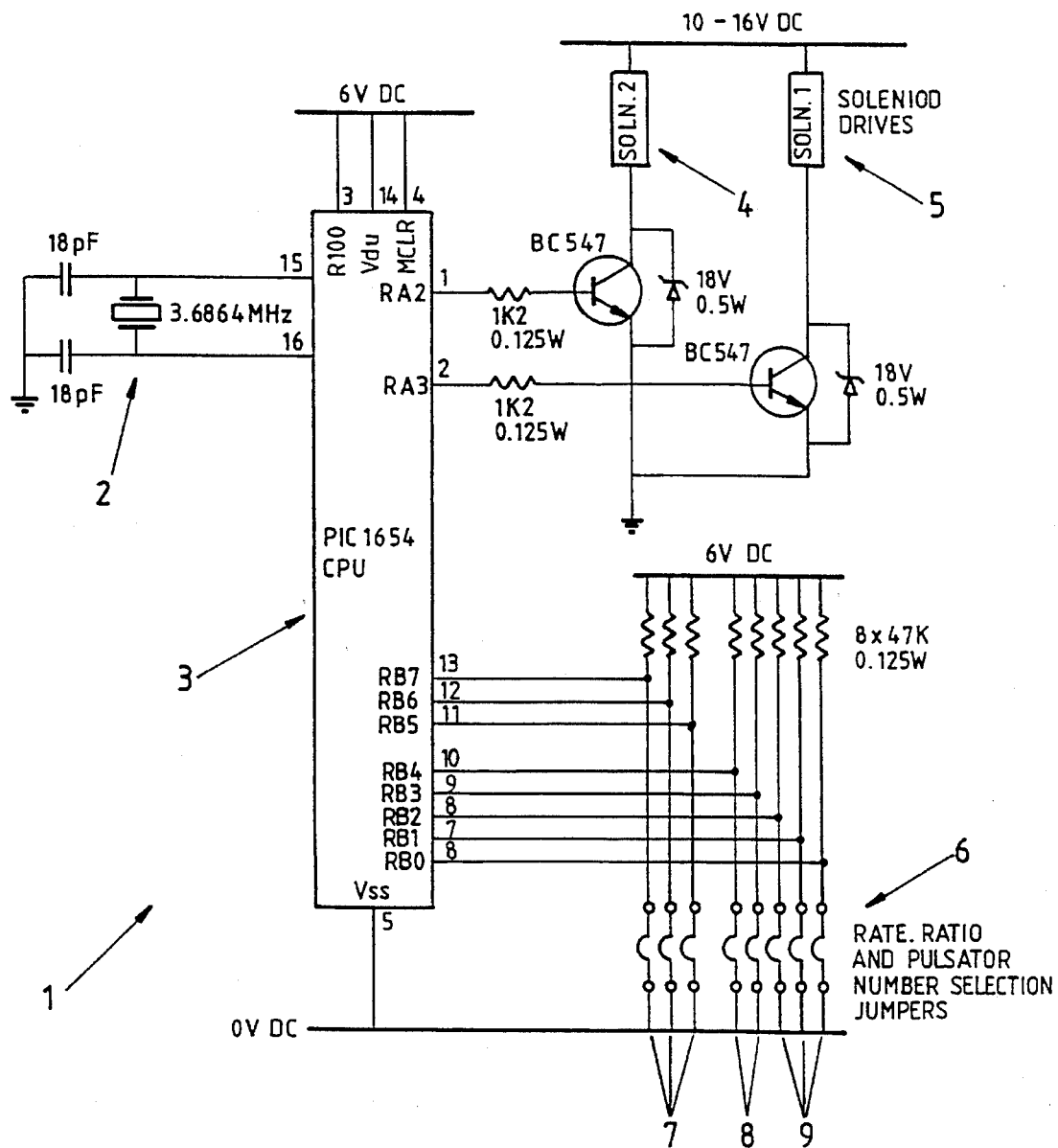
FIG. 1 is a schematic of the electronic circuit arrangement according to one possible embodiment of the present invention.

One embodiment of the present invention is shown in the circuit diagram of FIG. 1 in which a circuit 1 is provided. Said circuit has two solenoid drive outputs 4 and 5 and input 6. In one form of the invention, the circuit is controlled by a programmed CPU and in one embodiment of the invention, this CPU consists of a P IC 1654 CPU (Microchip Inc. U.S.A.). However, those skilled in the art will recognise that there are a variety of CPUs which may be substituted.

In one embodiment of the present invention, the timing of the circuit is provided by a quartz crystal timer. In the embodiment illustrated in FIG. 1, the quartz crystal has a frequency of 3.6864 megahertz. However, those skilled in the art will recognise that a variety of different frequencies may be used.

In one embodiment of the present invention, eight pulsators are provided, each with a controller as illustrated in FIG. 1. The eight controllers are assigned eight individual identification numbers and it is this identification number which is recognized by each CPU to provide the differing offsets for the pulsating of the eight pulsators. In one embodiment of the present invention, the pulsator number is input into the controller by means of the selection jumpers 7. Three selection jumpers are provided which provide input into pins 11, 12 and 13 of the CPU and thus up to eight unique pulsator numbers are provided for, ie. binary number 000—all selection jumpers absent to 111, ie. all selection jumpers present.

In one preferred embodiment of the present invention the controllers are provided with the three selection jumpers soldered or otherwise in place and, when the pulsators are installed, various selection jumpers can be clipped to provide each pulsator with a unique pulsator number.

Other inputs provided by the selection jumpers are pulsator ratio and pulsator rate. In one possible embodiment of the present invention the pulsator ratio is provided by selection jumpers 8 and pulsator rate selection is provided by selection jumper 9. In forms of the invention selection jumpers 8 and 9 may be provided by touch buttons thus enabling the user to make selections of the pulsator rate and ratio. In other forms of the invention, the pulsator rate and ratio are preset and the selection jumpers can be provided by wires or similar soldered in place.

In an embodiment of the invention controlling a pulsator functioning in the known 2+2 sequence the output of the circuit is provided by solenoid one and two labelled 5 and 4 in FIG. 1. It is these solenoids that drive the shuttle or similar valve which is included in the pulsator to provide for the switching between the vacuum and atmosphere that provides the pulsing of the cups of the milking claw.

The two solenoids may be of the form of vacuum solenoids and form part of a 2+2 pulsator as disclosed in our New Zealand Patent Application 248444 filed on 19 Aug. 1993.

Figure 2:
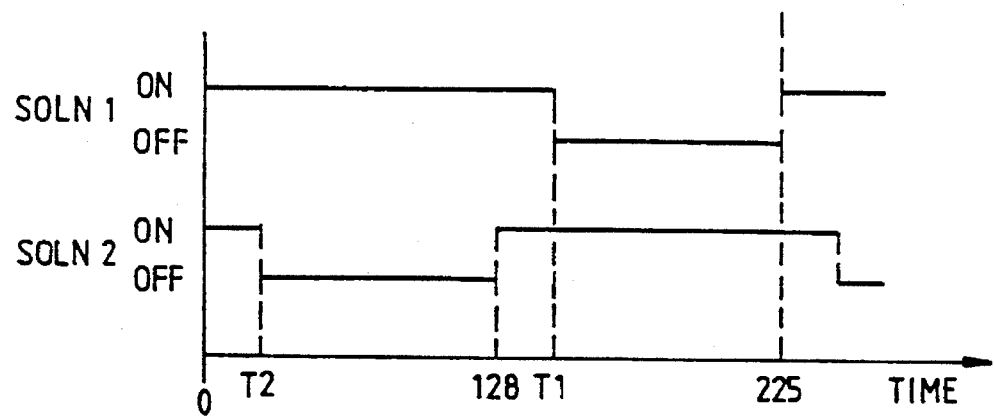
FIG. 2 is a graph showing the output generated by the circuit with the state of solenoid 1 and solenoid 2 shown, the use of two solenoids enables the cups of a milk claw to be pulsed in the known 2+2 mode, a single solenoid only if desired (for a 4+0 mode) can be used.

The output generated by the circuit of FIG. 1 is shown in FIG. 2 which illustrates the state of the two solenoids, solenoid one and solenoid two. It can be seen that the two solenoids, solenoid one and solenoid two are exactly out of phase with each other.

Figure 5:
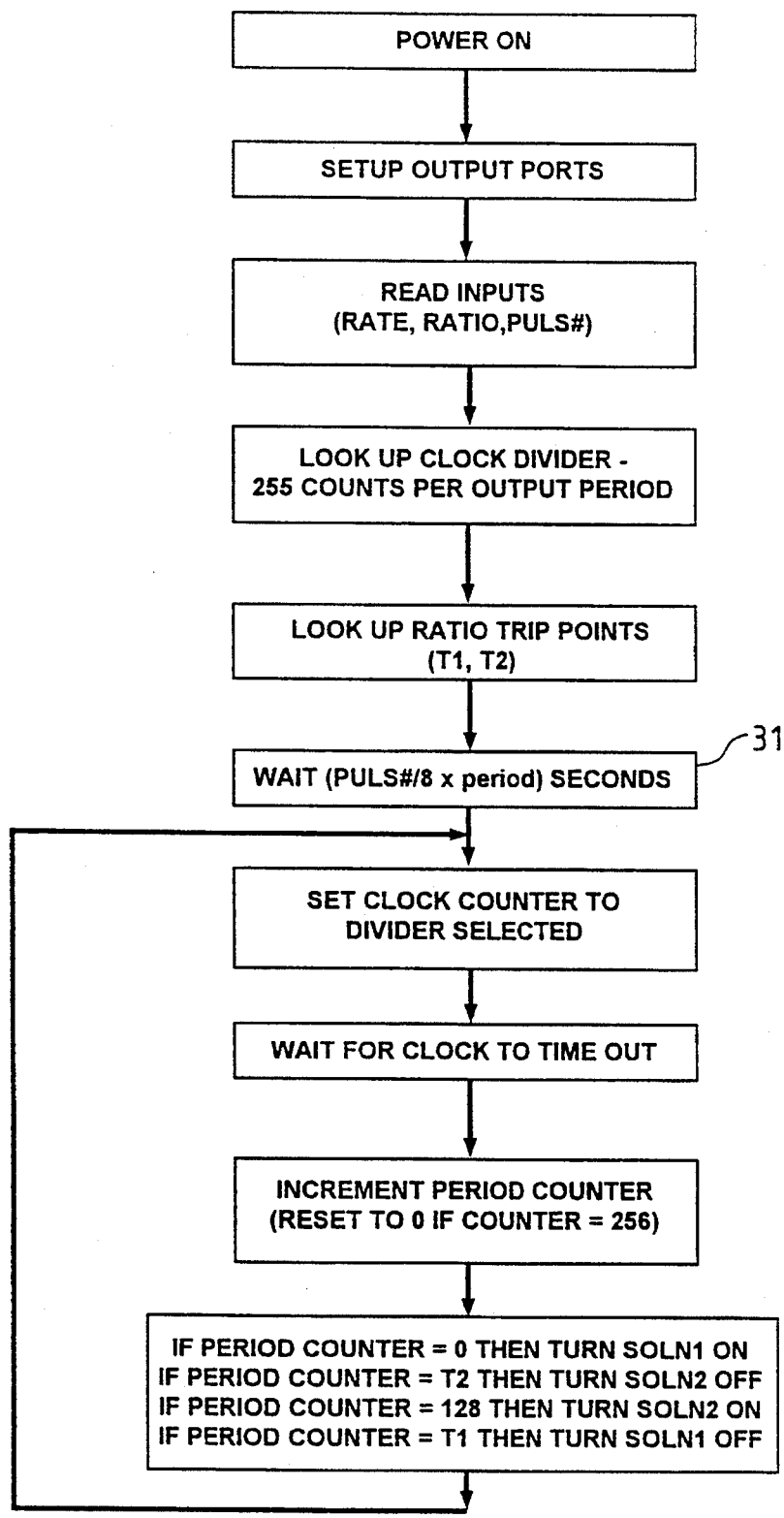
FIG. 5 is a schematic flow diagram of a program for controlling CPU's according to one embodiment.

Those skilled in the art will realise that a variety of programs would perform the required functions. One such program is given diagrammatically in the flow chart of FIG. 5. It can be seen that the software follows the following steps:

—Power on is provided to the various pulsator controllers from a common power source.
—The program proceeds to set up the output ports, ie. solenoid one and solenoid two labelled 4 and 5 in FIG. 1.
—The program then reads the input of rate, ratio and pulse number. These are provided by the number selection jumpers 7, 8 and 9.
—The software then looks up the clock divider. This is used to provide 255 counts per required output period and it is likely that once initially set up this clock divider would not be changed.
—The software then looks up the ratio trip point T1 and T2. These trip points are the solenoid one and solenoid 2 switch off points as shown in FIG. 2.
—The software then waits for a time equal to pulse number divided by 8 (the number of pulsators in a circuit) times the period seconds. It is this that provides the delays which offset the pulsation of the pulsators from one another thus reducing the load on the milk and vacuum lines.
—The program proceeds to set the clock counter to divider selected then waits for the clock to time out. The period counter is incremented and reset to zero if the period counter equals 256. A check is made of the period counter and if it equals zero, solenoid two is switched to on. If it is equal in value to T2, solenoid two is turned off. If the period counter equals 128 then solenoid two is turned on. If the period counter equals T1 then solenoid one is turned off. This output is shown in FIG. 2. The two solenoids provide for the use of a 2+2 mode of pulsing in the milk claws.
—The software then jumps to the point labelled 30, ie. to the point in the flow diagram where the clock counter is set to the divider selected.
—The program then cycles through the steps outlined above thus providing a sequence of output to the solenoids.

It can be seen that at the program step labelled 31, the wait period is dependent upon the pulsator number or PULS# assigned to the individual pulsator.

Figure 4:
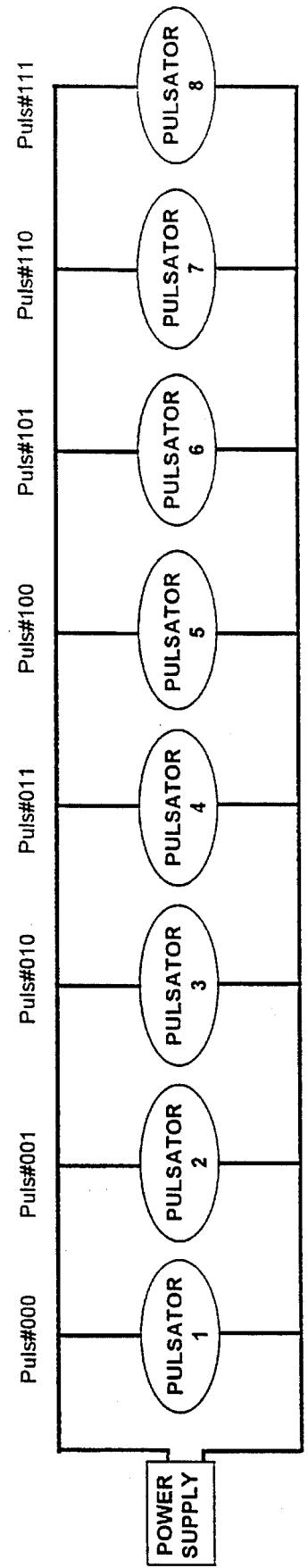
FIG. 4 shows a diagrammatic view of one possible arrangement of eight pulsators according to one possible embodiment of the present invention.

One possible use of the present invention is as illustrated at FIG. 4 where eight pulsators are connected to a common power supply. The eight pulsators are each assigned a unique pulsator number or PULS# and this unique number is shown, by way of example, in a three digit binary number. It is these unique pulsator numbers which provide different wait periods or delays in the step of the program labelled 31 in the flow diagram of FIG. 6.

The eight pulsators are connected to a common power supply and thus are powered on at the same time. The differing pulsator numbers ensure that the initial pulse of all pulsators occurs at differing times. The accuracy of the frequency derived from the individual quartz crystals in each circuit ensure that these differences in times or delays are maintained between the pulsation of the various pulsators throughout a typical milking period which may take two or more hours. The power supply system to each pulsator is simplified with respect to prior art power supplies, ie. require only an electrical connection to and from each pulsator.

What is claimed is:

1. An electrically controlled dedicated pulsator suitable for use as one of several pulsators in a milking machine, said dedicated pulsator comprising a computerized processor and timing means, said computerized processor and said timing means being arranged so that said computerized processor determines a pulsation sequence and also determines a start delay of the pulsation sequence, said computerized processor being arranged so as to determine a start time by reference to said timing means, said timing means being initiated solely by reference to the commencement of electrical energization of the computerized processor.

2. A milking machine having a plurality of milking claws, each controlled by at least one electrically controlled dedicated pulsator, said at least one electrically controlled dedicated pulsator comprising computerized processing means and timing means, said computerized processing means having a pulsation sequence controlled by said computerized processing means, said computerized processing means being arranged such that there is a ripple sequencing of pulsation of the milking claws by said computerized processing means, each claw being controlled by reference to the timing means without signals from or to other claws, said timing means being synchronized by electrical energization of the computerized processing means.

3. The milking machine of claim 2 wherein said electrical energization of the computerized processing means occurs upon electrical energization of the milking machine so that said timing means is responsive to energization of the milking machine.

4. The milking machine of claim 2 wherein said timing means are each synchronized upon start up of the milking machine by virtue of electrical energization of the computerized processing means at start up.

5. The milking machine of claim 2 wherein each pulsator is identifiable by a reference number associated with each computerized processor, and wherein a common program which includes at least most of the reference numbers is included in each computerized processing means.

6. A method of ripple sequencing pulsations of a plurality of pulsators in a milking machine, said method comprising the steps of:

provinding each milking claw of the milking machine with a computerized processing means capable of determining which of said plurality of pulsators is controlled by the computerized processing means;

in response to electrical energization of said computerized processing means, synchronizing said plurality of pulsators;

controlling each milking claw via a respective one of said computerized processing means to pulsate in a pulsation sequence with reference only to a respective timing means and without reference to any other processing means and without reference to the status of any other pulsator or timing means.

7. The method of claim 6, wherein said timing means is a dedicated timer in each pulsator and each dedicated timer is synchronized upon electrical start-up of the milking machine.

* * * * *